Dec. 11, 1945.  E. A. FUGLIE  2,390,933
CRANKSHAFT SUPPORT AND GRINDER
Original Filed Aug. 2, 1941   2 Sheets-Sheet 1

Inventor
ELMER A. FUGLIE

Dec. 11, 1945.  E. A. FUGLIE  2,390,933
CRANKSHAFT SUPPORT AND GRINDER
Original Filed Aug. 2, 1941  2 Sheets-Sheet 2
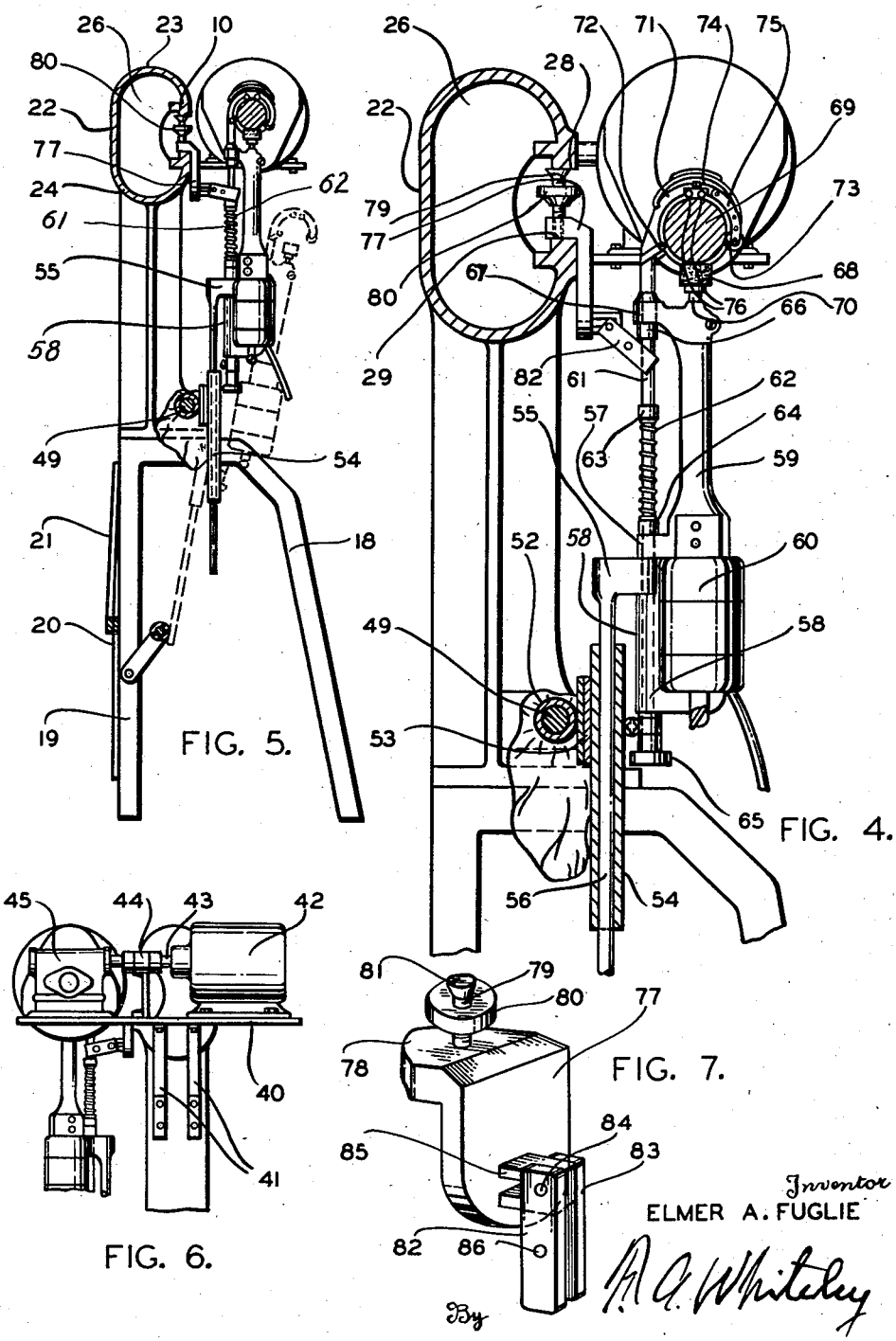

Patented Dec. 11, 1945

2,390,933

UNITED STATES PATENT OFFICE 2,390,933

CRANKSHAFT SUPPORT AND GRINDER

Elmer A. Fuglie, Winona, Minn., assignor to Winona Tool Mfg. Company, Winona, Minn., a corporation of Minnesota Continuation of application Serial No. 405,258, August 2, 1941. This application August 23, 1943, Serial No. 499,729

6 Claims. (Cl. 51—129)

My invention relates to a crankshaft support and grinder and has for its object to provide a frame having means for holding a grinder adapted to engage the under side of a crankshaft bearing in combination with a head piece embodying means for holding the crankshaft offset therefrom so that the grinder and the parts connected therewith may be positioned immediately below and in operative engagement with the bearings of the crankshaft.

In the grinding of crankshafts, specifically multi-bearing crankshafts for automobiles, a problem is met in supporting and rotating the crankshaft in a position to be operated upon by the grinder. As is well known, crankshafts vary very considerably in length, not only due to the number of bearings (corresponding to the number of cylinders of the motor), four, six, eight and twelve, but because gas engines of different manufacturers may also have variations. A grinder therefore, must have adaptability to mount and rotate crankshafts of these varying lengths. Further, it has been found that the most effective way of grinding the crankshaft is by using a flat face of a cylindrical grinder positioned to fall substantially along and parallel with the axial center of the crankshaft bearing. This, in the case of the rod bearings or throw bearings, necessitates room for the crankshaft and the operating means therefor to oscillate so as to remain in engagement with the lower portion of the rod bearing throughout the complete circumference of its throw.

It has been proposed under certain conditions to grind crankshafts when being operated upon the gas engine itself. This grinding is from below, but has limitations in operation that make the method unsatisfactory.

It has also been proposed to hold the crankshaft between the head stock and tail stock of an ordinary lathe with, of course, means to adjust the tail stock along the lathe bed and to mount the grinder to operate from above. But this likewise has resulted in unsatisfactory work, because of the difficulty of supporting the grinder operating mechanism without putting too much weight upon the grinder, and the further resulting difficulty of getting a uniform bearing of the grinder upon the crankshaft bearing; and also there are grave difficulties as to available observation space for operation of the grinder mechanism.

I have discovered that all these difficulties may be avoided and successful and effective grinding of the bearings of crankshafts made possible by providing a supporting head piece having a laterally positioned connector guideway in the form of a long side slot positioned in the head piece, and mounting adjustable brackets therein which carry offset a sufficient distance laterally from the supporting means a driving head stock and an adjustable tail stock mounting chuck shafts between which the crankshaft is mounted for rotation at a point offset laterally a sufficient distance from the main supporting means to overlie an open space below the crankshaft, and to mount the grinder and the means for operating the grinder in a position in said open space also offset from the main supporting means and to hold the grinder face against the crankshaft bearing with a fixed and definitely certain predetermined pressure and at the same time give the operator an abundance of room to work on and with the grinder mechanism.

It is a principal object of my invention therefore, to provide a frame with upright standards and a sufficiently massive head piece wherein the opening for adjustably mounting the holding means is an elongated slot at the side thereof so that the said holding means may be projected laterally therefrom.

It is a further important object of my invention to provide in conjunction with said head piece and the open slot extending along a side thereof sets of brackets adapted to be adjustably and rigidly secured in said slots and to carry respectively a driven chuck shaft and also a complementary chuck shaft on the adjustable bracket so that there can be mounted between said chuck shafts and in axial alignment with the axial centers thereof, crankshafts of varying lengths to be rotated by the driven shaft while they are held at a very considerable distance laterally from the head piece which supports them, thus being held to overlie an open space below the crankshaft in which the grinder assembly is mounted and operates.

It is a further object of my invention to so laterally support the driving means including a prime mover, such as an electric motor, for operating the driven chuck shaft so that the crankshaft as mounted and driven will be at a substantial distance from the supporting head piece and at the same time will be so mounted as to leave large free space below the crankshaft as driven.

It is a further object of my invention to provide on the frame member for supporting the crankshaft a supporting stabilizer shaft which will be positioned at the boundary of the aforesaid space below the supported and driven crankshaft and to mount upon said stabilizer shaft for sliding movements therealong and rocking movements thereupon, an assemblage which includes means for supporting the same upon a crankshaft bearing such as a throw bearing and which presents the grinder face with a predetermined grinding pressure directly to the surface of the crankshaft bearing.

This application is a continuation of application, Serial No. 405,258, filed August 2, 1941, for Crankshaft support and grinder.

The full objects and advantages of this invention will appear in connection with the detailed description thereof given in the appended specification, and the novel features from which are obtained the advantageous results above noted will be particularly pointed out in the claims.

In the drawings illustrating an application of my invention in one form:

Fig. 4 is a sectional elevation view, taken on line 4—4 of Fig. 1, showing the grinder assemblage floatingly supported from one of the offset or throw bearings of the supported crankshaft.

Fig. 5 is a similar section to that of Fig. 4, showing the entire base frame of the machine in elevation and showing the grinder unit applied to one of the main bearings.

Fig. 6 is a detail view of the electric motor and supporting shelf which operates the chuck shaft to rotate a crankshaft held to said chuck shaft.

Fig. 7 is a perspective detail view of the means for locking the holding brackets in operative position.

Figures 1, 2, 3:
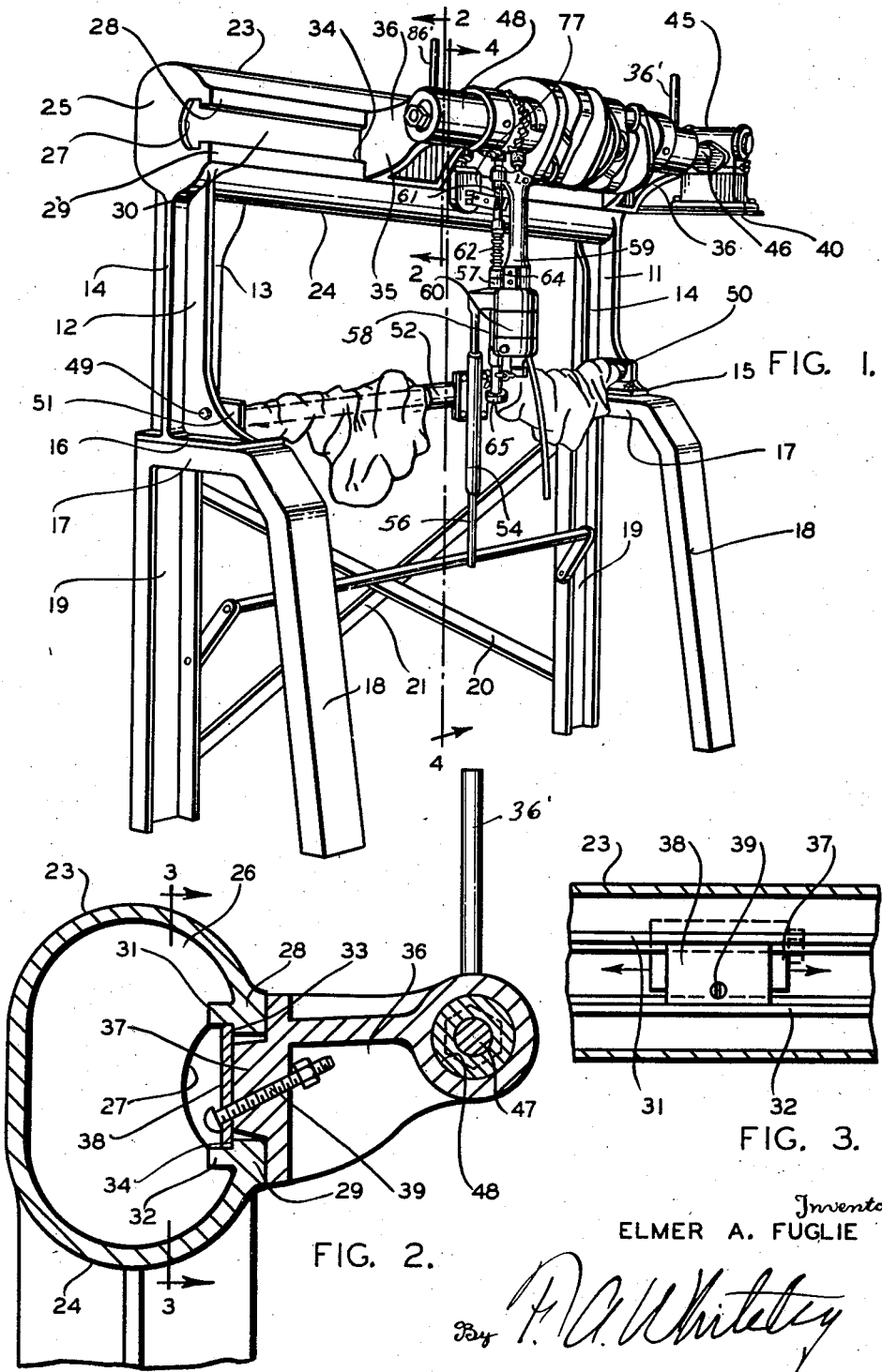
Fig. 1 is a semi-perspective elevation view of my crankshaft support and grinder as it would appear in use.
Fig. 2 is a section on an enlarged scale, taken on line 2—2 of Fig. 1.
Fig. 3 is a fragmentary sectional elevation view, taken on line 3—3 of Fig. 2.

As illustrated, a massive head piece 10 may have integrally formed therewith correspondingly heavy end standards 11 and 12, each formed with webs 13 and 14 extending in the longitudinal plane of the center of the head casting 10. The standards 11 and 12 are provided with bottom plates 15 and 16, each of which is adapted to rest upon a transverse table member 17 formed between supporting legs 18 and 19 which form stands in this manner to support the head piece 10. Braces 20 and 21 extend in crossing fashion diagonally from top to bottom of the respective leg members. The head piece 10 is in cross-section in the form of an enlarged oval with a flat back wall 22, a curved top wall 23, a curved bottom wall 24, and end walls 25 and 26. Additional transverse webs of the same shape as the end walls 25 and 26 may be cast integrally along the central part of the head casting for increasing its strength if desired.

As shown in Figs. 1 and 2, the end wells 25 and 26 (and any intermediate webs, if used) are arcuately cut as indicated at 27. Heavy ribs 28 and 29 are formed at the margin of the top and bottom walls 23 and 24, spaced apart so as to leave a longitudinal open channel slot 30 between them. Inwardly extending horizontal flanges 31 and 32 provide ledges 33 and 34, extending the length of the channel 30. Powerful double-armed brackets 35 and 36 are formed with a massive supporting head 37, Fig. 2, which engages a plate 38 adapted to be inserted to contact the ledges 33 and 34 as shown in Fig. 2. Bolt means 39 extending through the head member 37 secures the brackets 35 and 36 rigidly in any desired position along the channel slot 30. Rods 36' are secured to the brackets 35 and 36 to furnish hand holds for aiding in positioning the brackets. Upon a shelf 40 secured by brackets 41 to the standard 11 is mounted a motor 42, Fig. 6. The shaft 43 of the motor passes through a bearing on a standard 44 into a gear box 45 from which the chuck shaft 46 is driven. A chuck shaft 47 is mounted in a long bearing 48 formed on the end of bracket arm 36 which, as clearly indicated in Fig. 1, is adjustable along the channel slot 30 for receiving with the chuck shaft 46 any crankshaft such as 48 and holding it positioned for rotation, by means of motor 42, in a position above an open space between the crankshaft so mounted and the floor, and in convenient position relative to the eyes of the operator for close inspection during the grinding operation.

A stabilizer shaft 49 is held rigidly mounted at its ends as indicated at 50 and 51, Fig. 1, in the base supports 15 and 16 of the standards 11 and 12, respectively. This shaft is strong and milled perfectly round and has mounted thereon an elongated bearing member 52, Figs. 1 and 4. The bearing member 52 has secured thereto a bracket 53 which supports an elongated tubular guide 54, Figs. 1 and 4. This arrangement thus permits the guide 54 to be moved longitudinally along the stabilizer shaft 49 and also to oscillate on it.

A stem or slide 56 carries at its upper end an extension bracket 55, Fig. 4. The stem 56 is mounted in and movable lengthwise along the tubular guide member 54. The extension bracket 55 has its upper and lower faces extending between and held in position by the respective lower and upper faces of a pair of projecting lug members 57 and 58 fast on a grinder assembly framework 59, on which is supported a motor 60.

A shaft 61, best shown in Fig. 4, is slidably mounted in and to extend through alined openings through the lugs 57 and 58, through the intervening extension bracket member 55 and through a positioning or bearing portion 66 connected with a lug extension 67 on the frame 59. The shaft has rigidly secured thereto an upper spring-receiving collar 63 and freely slidable thereon a lower spring-receiving collar 64. A spring 62 between collars 63 and 64 holds the collar 64 in engagement with the upper surface of lug 57.

The shaft 61 has secured thereto at its upper end a hook 71 provided with upper ball bearings 76 and roller bearings 72 and 73 adapted to engage the surface of the crankshaft bearing below a horizontal element thereof. The hook 71 has a swinging part 75 which is adapted to be held in clasping relation by the clasp spring 74. In this way the weight of the grinder assembly is entirely supported by direct downward thrust upon the bearings 76, and laterally by the rollers 72 and 73.

The grinder frame 59 houses the driven shaft 70 of motor 60, which shaft has on its upper end a grinder 68, which in practice will preferably be a cylindrical member with a plane top face made up of "carborundum" or other abrasive material. A thumb nut 65 threaded on the lower end of shaft 61 may cause said shaft to move in either direction through the several openings in members 55, 57, 58, and 67. When the hook member 71, 75 is in position upon a crankshaft bearing such as 69 it will be apparent that this action will cause the face of the grinder 68 to move toward or from the lower surface of the crankshaft bearing. As it moves toward the crankshaft bearing the spring 62 will be compressed. This spring is a fairly strong spring and is always under compression when the grinder is brought into operative position in reference to a crankshaft bearing. The effect is to hold the grinder assembly with a yielding but persistent force against the threads of the screw 65.

From the above arrangement it will be clear that as a throw bearing revolves, the crankshaft assemblage may rise and fall with the sliding of the stem 56 in the guide 54 and may rock back and forth by reason of the mounting of the sleeve 54 upon the stabilizer shaft 49, so that the grinder shaft may partake of the up and down and oscillating movement of the crankshaft bearing to which it is applied. The frame 59 and motor 60 connected thereto and shaft 70 for driving the grinder 68, are all supported for lateral oscillating movements upon the projections 57, 58 and 67, Fig. 4. Also, the grinder disc 68 is of considerably less diameter than the distance between the bearing cheeks of the crankshaft. This enables the operator by grasping the frame member 59 to oscillate the face of the grinder upon the surface of the throw bearing 69.

When it is desired to operate the grinder assemblage upon a main bearing the grinder assemblage will be held against up-and-down and oscillating movement by the following means. A bracket 77 is provided with an extension 78 forming a hook-line projection over the longitudinal rib 29. A screw member 79 is adapted to be actuated by a thumb nut 80 and is adapted to engage with its upper end 81 the upper rib 28. By this means, the bracket 77 can be held rigidly secured to the head piece 10 in any adjusted position in the plane of the shaft 61 of the grinder assemblage. Clamp members 82 and 83, Fig. 7, are pivotally mounted at 84 to a lug 85 on the bracket 77. These clamp members are spaced apart as indicated and are adapted to be swung into the position shown in Fig. 4, embracing the shaft 61. These members frictionally engage the shaft 61 with a sufficient grip to hold it from any movement and a set-screw 86 may be employed to hold the members in rigid clamping position.

The advantages of my invention have been quite clearly pointed out in the appended specification. The fundamental and primary advantage is that it provides a means of supporting a crankshaft in a position directly above a free space extending from the crankshaft to the floor so that within this free space the grinder assemblage may be mounted for its lateral movements to connect it with any bearings of such supported grinder shaft and for its normal operation in effecting the grinding operation, all in a position where the operator has easy access to all parts of the grinder assemblage and has the bearings being ground positioned in his line of vision.

These advantages are what makes possible the grinding of crankshafts separated from a motor from below wherein the crankshaft grinder is yieldingly held against the under side of the crank bearing in all of its positions.

I claim:

1. A crankshaft grinder, comprising a frame formed with end standards and an enlarged tube-like head piece, an open slot extending along a side of said head piece, bracket members adjustably mounted in said slot upon said head piece to extend laterally therefrom, chuck shafts mounted in said bracket piece and adapted to hold a crankshaft in a position overlying an open space extending between the crankshaft and the floor, means having operative connection with said chuck shafts for rotating them and the crankshaft held therebetween, a stabilizer shaft supported by the standards and extending across said space, and a grinder and means for rotating the grinder while held upon the crankshaft and said stabilizer shaft for grinding the crankshaft.

2. A crankshaft grinder, comprising a frame formed with end standards and an enlarged tube-like head piece, an open slot extending along a side of said head piece, bracket members adjustably mounted in said slot upon said head piece to extend laterally therefrom, chuck shafts mounted in said bracket members and adapted to hold a crankshaft in a position overlying an open space extending between the crankshaft and the floor, means for locking said chuck shafts in adjusted position to hold the crankshaft properly positioned above said open space, a motor mounted on the frame having operative connection with one of said chuck shafts for rotating them and the crankshaft held therebetween, a stabilizer shaft held at one side of said open space, a grinder held thereon, and means for moving the grinder along said stabilizer shaft and suspending it from a selected crankshaft with the grinder below and in contact therewith.

3. A crankshaft grinder, comprising a frame formed with end standards and an enlarged tube-like head piece, an open slot extending along a side of said head piece, bracket members adjustably mounted in said slot upon said head piece to extend laterally therefrom, chuck shafts mounted in said bracket piece and adapted to hold a crankshaft in a position overlying an open space extending between the crankshaft and the floor, means for locking said chuck shafts in adjusted position to hold the crankshaft properly positioned above said open space, means having operative connection with said chuck shafts for rotating them and the crankshaft held therebetween, a stabilizer shaft held at one side of said open space, and a grinder assemblage including a flat-faced disc grinder slidably supported on said stabilizer shaft, means for holding said face yieldingly against the under side of the crankshaft bearing and a motor for rotating the grinder, said assemblage being mounted in said open space.

4. A crankshaft grinder, comprising a frame formed with end standards and an enlarged tube-like head piece, an open slot extending along a side of said head piece and having interior and exterior bearing surfaces at its margins, bracket members having flanges adapted to engage the outer bearing surface, a plate engageable with the inner bearing surface and screw bolts for drawing the flanges of the bracket member and portions of said plate in firm contact with said bearing surfaces to adjustably mount the brackets on the head piece, said brackets extending laterally therefrom and having mounted thereon chuck shafts for holding a crankshaft in a position overlying an open space extending between the crankshaft and the floor, and a grinder assemblage supported in said open space and held for operation of the grinder thereon upon the under side of a crankshaft bearing.

5. A crankshaft grinder, comprising a frame formed with end standards and an enlarged tube-like head piece, an open slot extending along a side of head piece, means adjustably mounted in said slot for holding a crankshaft in a position overlying an open space extending between the crankshaft and the floor, said means being positioned at a height to bring the cranks on the crankshaft in general alignment with the eyes of an operator in front of the apparatus, means for rotating the crankshaft as so held, a plane-faced grinder disc of considerably less diameter than the distance between the bearing cheeks of the crankshaft, means for holding said face upon the surface of a crankshaft bearing, said holding means being formed and mounted to permit an operator to oscillate the grinder under inspection of the operator in a substantially horizontal plane while so held.

6. An adjustable crankshaft device including an upright lateral support having a pair of slidable journal brackets supported from the track of said support, and said track extending along a side of said support, said journal brackets adapted to support chuck and spindle means for holding a crankshaft and the like rotatable between said bearing brackets, means for rotating the crankshaft while supported between the bearing brackets, a horizontally extending stabilizer shaft rigidly secured to said support and lying in a plane parallel to the track of said support, a journal bracket extending about said stabilizer shaft and slidably supported thereon, a grinder unit for grinding the bearings of the crankshaft, a stabilizer rod rigidly secured to said grinding unit and being slidably supported in said journal bracket, and means for locking said grinder unit in operative position while grinding a bearing.

ELMER A. FUGLIE.